(12) United States Patent
Smith et al.

(10) Patent No.: US 10,962,144 B2
(45) Date of Patent: Mar. 30, 2021

(54) SYSTEM, APPARATUS AND METHOD

(71) Applicant: ROYAL IHC LIMITED, Stocksfield (GB)

(72) Inventors: Michael James Smith, Stocksfield (GB); Kathleen Margaret Gething, Stocksfield (GB)

(73) Assignee: ROYAL IHC LIMITED, Stocksfield (GB)

( * ) Notice: Subject to any disclaimer, the term of this patent is extended or adjusted under 35 U.S.C. 154(b) by 0 days.

(21) Appl. No.: 16/486,366

(22) PCT Filed: Feb. 16, 2018

(86) PCT No.: PCT/EP2018/053926
§ 371 (c)(1),
(2) Date: Aug. 15, 2019

(87) PCT Pub. No.: WO2018/149987
PCT Pub. Date: Aug. 23, 2018

(65) Prior Publication Data
US 2020/0003336 A1      Jan. 2, 2020

(30) Foreign Application Priority Data
Feb. 17, 2017 (NL) ..................... 2018392

(51) Int. Cl.
*F16L 1/19* (2006.01)
*F16L 1/20* (2006.01)

(52) U.S. Cl.
CPC ............ *F16L 1/19* (2013.01); *F16L 1/207* (2013.01); *F16L 1/203* (2013.01)

(58) Field of Classification Search
CPC combination set(s) only.
See application file for complete search history.

(56) References Cited

U.S. PATENT DOCUMENTS

| 6,254,030 B1 * | 7/2001 | Sloan, Jr. ............... G05D 1/12 244/3.21 |
| 6,352,388 B1 | 3/2002 | Seguin |
| 2011/0236137 A1 * | 9/2011 | Legaignoux ............. F16L 1/19 405/158 |
| 2016/0252195 A1 | 9/2016 | Roodenburg et al. |
| 2016/0298793 A1 * | 10/2016 | Green .................... F16L 1/207 |

FOREIGN PATENT DOCUMENTS

| CN | 105050893 A | 11/2015 |
| WO | 2004/068012 A2 | 8/2004 |
| WO | 2006/085739 A1 | 8/2006 |
| WO | 2009/022177 A2 | 2/2009 |
| WO | 2009/134116 A1 | 11/2009 |
| WO | 2014/120004 A1 | 8/2014 |

* cited by examiner

*Primary Examiner* — Kyle Armstrong
(74) *Attorney, Agent, or Firm* — E. Eric Mills; Nexsen Pruet, PLLC

(57) ABSTRACT

System for use in building and deployment of an elongate element (202) in a J-lay operation. The system includes an upright structure (206); a winching element (204) retractable along an axis within the upright structure (206); a coupling element (210) connected to the winching element (204), for coupling the winching element (204) to an elongate element (202); and a catcher element (212) configured to retain the coupling element (210) in alignment with a predetermined axis within the upright structure (206) during retraction or extension of the winching element (204).

7 Claims, 11 Drawing Sheets

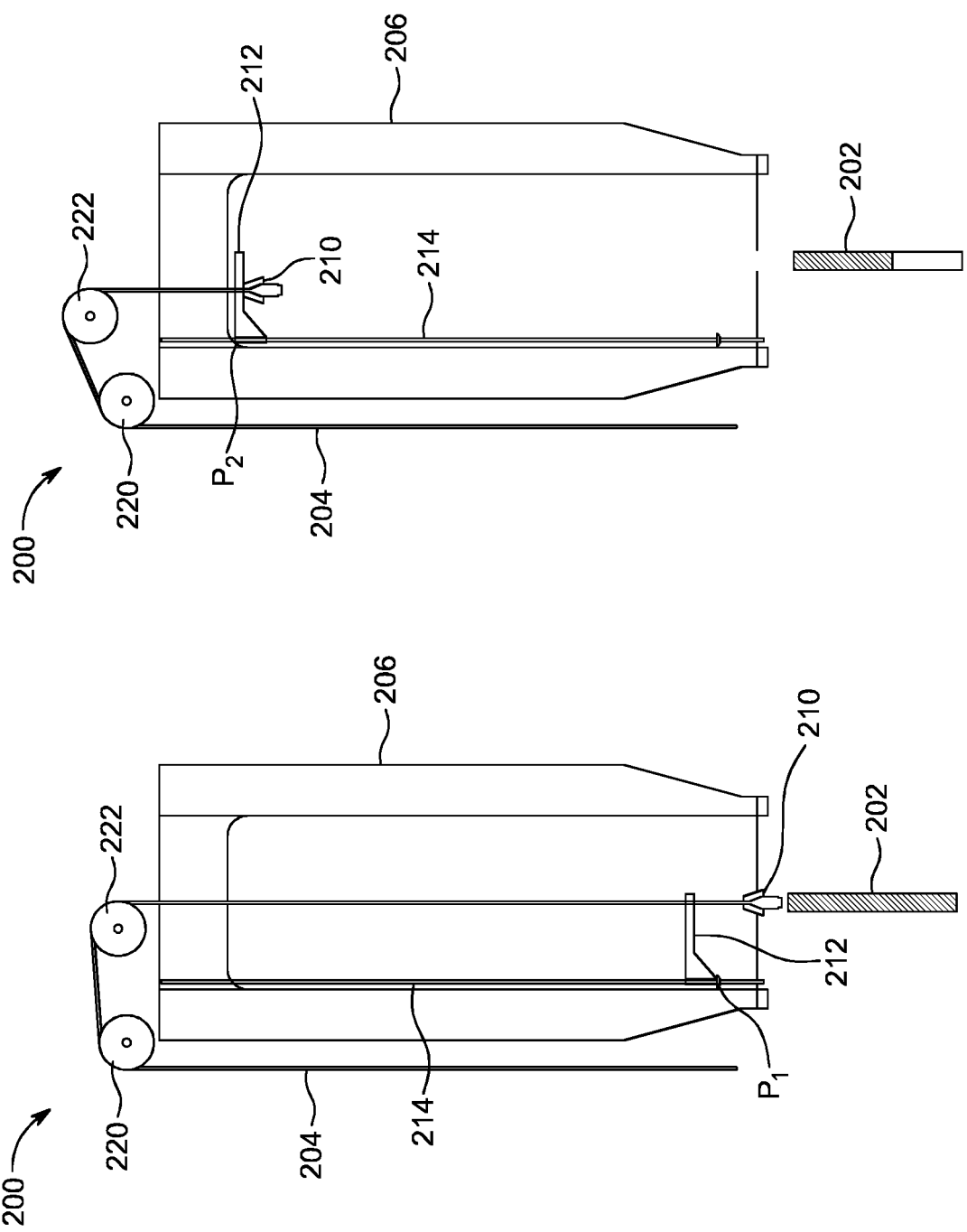

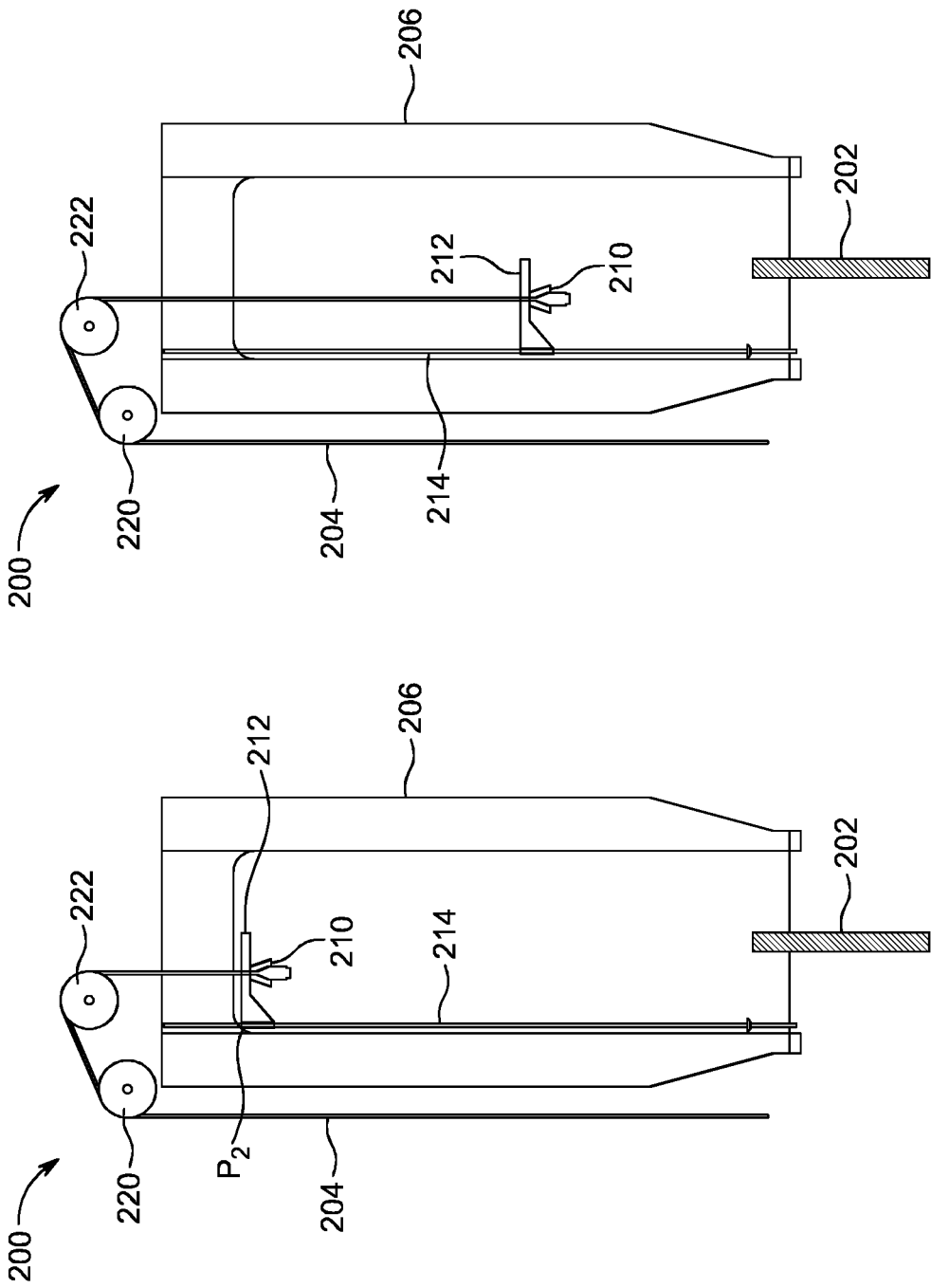

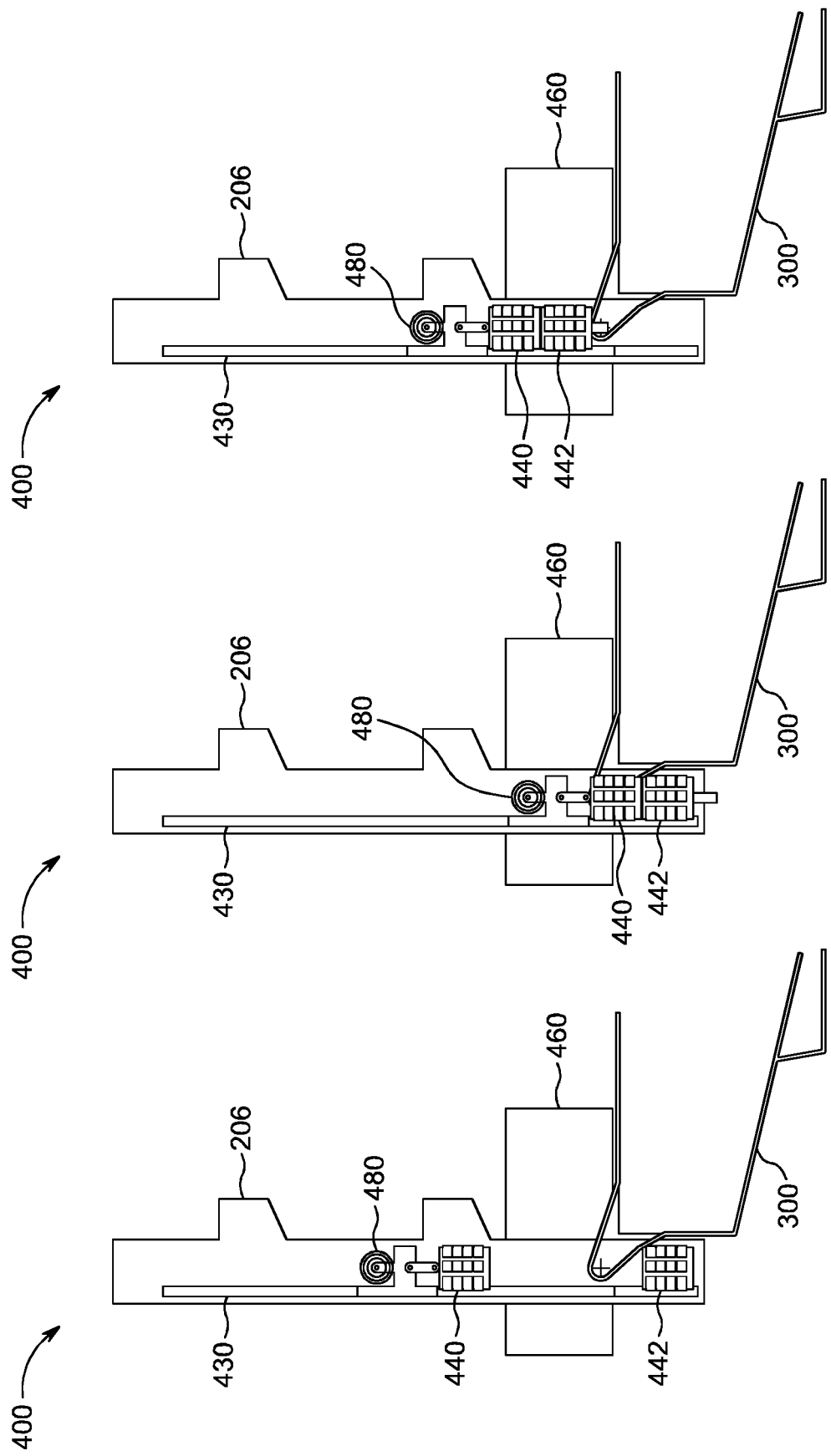

SYSTEM, APPARATUS AND METHOD

CROSS REFERENCE TO RELATED APPLICATIONS

This application is a 35 U.S.C. § 371 U.S. national phase entry of International Application No. PCT/EP2018/053926 having an international filing date of Feb. 16, 2018, which claims the benefit of The Netherlands Application No. 2018392 filed Feb. 17, 2017, each of which is incorporated herein by reference in its entirety.

The present invention relates to a system, apparatus and method. In particular, but not exclusively, the present invention relates to a system and method for laying pipelines from a marine vessel to a subsea location.

Traditionally, pipelines may be deployed from a vessel and onto the sea bed as a continuous pipe length using various techniques. In "J-lay" systems, pipe sections are sequentially added and secured to the pipeline being deployed in an assembly-line type of method. Some J-lay systems employ static clamps and mobile clamps for deploying and lowering pipe sections into a J-lay configuration.

On a marine vessel, a pipe section is raised from a horizontal position on the deck, to a more vertical position, to be held by a tower. The pipe section is then lowered down the tower until the lower end of the pipe section is in close proximity to an upper end of a previously deployed pipe section (field joint). The lower end of the pipe section is then coupled to the upper end of the previously deployed pipe section by a suitable method of attachment, for example by welding. For effective coupling, both sections are typically held or clamped into position during attachment.

Following attachment, the pipe section is lowered from the marine vessel, e.g. via a moon pool or edge of vessel, and the process is repeated. As the pipeline is built up, it is lowered along the "lay-line", i.e. the position the pipeline follows as it is lowered from the tower to the subsea position. As shown in FIG. 1, the lay-line follows the shape of a letter "J" 100.

The welded pipe is thus gradually built, and lowered into the sea water, and will lay on the seabed or in a trench in a predetermined location. The pipe may be used for transporting production fluids such as oil, gas and water along the seabed, for example from a production platform to an on-shore location.

The J-lay technique can be used to lay pipeline at shallow or deep water depths, of typically around 750 m to 1000 m. Typically the pipe diameter may range from 5 to 36 inch (12.7 to 91.44 cm). The pipe section typically may be 12 m in length, though the pipe sections may be pre-welded in sets of 2×12 m lengths (so called double pipe joints, of 24 m), or 3×12 m lengths (so called triple joints, of 36 m), or 4×12 m lengths (so called quad pipe joints, of 48 m), or 6×12 m lengths (so called hex pipe joints, of 72 m), etc.

J-lay systems may include an abandonment and recovery system. This is used as a way to cease and restart the laying operation, and allows the pipeline to be lowered and recovered from the seabed using a wire-rope winch-base system. The abandonment and recovery system typically uses a winch or a series of winches to lower an abandonment and recovery rope termination into position so that it can be connected to the pipeline and subsequently raise/lower the pipeline. The second winch helps to guide the abandonment and recovery frame to help prevent unwanted swinging of the frame due to e.g. vessel motion. Swinging motions of the frame can quickly amplify during rough seas, for example, and this can cause damage to the system.

Handling the second winch requires an additional operation, which usually requires manual intervention. In addition, the winch/series of winches used to lower the abandonment and recovery frame cannot be located on the firing line of the pipeline (the line along which the pipeline is held and deployed from the J-lay tower) due to the presence of the pipeline in the firing line. As such, the abandonment and recovery frame and/or any connection between the abandonment and recovery system and the pipeline is offset from the firing line. The connection of the abandonment and recovery frame is carried out in a manned area with the assistance of lifting equipment.

In addition, changing angles of the J-lay tower with respect to the vessel can apply tension loads to the rope in the winching system. If there is no compliance in the system, the change in tower angle could damage the rope (e.g. by stretching), causing the rope to be slackened when the tower is reverted back to the original angle. In extreme cases, tension on the rope may cause the rope to break.

Sometimes different pipe sizes may be used for different laying operations. As such, various aspects of the J-lay systems may be adapted to allow for the use of different pipe sizes having either different pipe lengths, different pipe diameters or both.

The upper end of the previously deployed pipe section is typically held in place by a hang-off clamp. Typically, pads of the hang off clamps are manually replaced between the laying of pipes of different sizes. The pads are typically formed from a relatively high friction substance, which is pressed against the pipe in a gripping motion to hold up the pipe. The hang-off clamp is often located in an environment near or in the splash zone (the area where the pipe is deployed into the sea). This can be an unpleasant environment for workers to operate.

WO 2006/085739 discloses a marine pipe laying method and system for installing an offshore pipeline that includes one or more accessories. The method includes the steps of providing a vessel, launching the pipeline in a firing line from the vessel in the direction of the seabed, engaging the pipeline with a clamping device that is connected to the vessel and adapted to support the weight of the previously launched pipeline, and moving the accessory into the firing line to a position above the clamping device.

Reel-lay systems typically deploy a continuous pipeline, which is fed from a spool. Sometimes during a reel-lay operation, items may be attached to the pipe section. For example, items to be attached to the pipeline may include pipe jewelry such as buckle arrestors, anodes, strakes and buoyancy modules. This may be done while a section of the pipeline is mounted within a reel-lay tower. Typically, such activities are undertaken on a workstation located within the tower. In some situations it is advantageous to be able to undertake these operations and/or attach items at varying positions along the section of pipeline mounted within the tower (i.e. at various heights up the reel-lay tower).

WO 2004/068012 discloses arrangements for laying of rigid pipe from reeled storage and/or on-board welding fabrication.

According to a first aspect of the present invention there is provided a system for use in building and deployment of an elongate element in a J-lay operation, comprising:
　　an upright structure;
　　a winching element retractable along an axis within the upright structure;
　　a coupling element connected to the winching element, for coupling the winching element to an elongate element; and a catcher element configured to retain the coupling element in alignment with a predetermined axis within the upright structure during retraction or extension of the winching element.

According to a second aspect of the present invention there is provided a system for use in building and deployment of an elongate element in a J-lay operation, comprising:
an upright structure;
a first and second clamping element, each clamping element traversable along the upright structure;
an actuating element configured to control movement of the first clamping element with respect to the upright structure;
wherein the second clamping element is configured to couple with the first clamping element so that, when coupled together, the actuating element can control movement of both the first and the second clamping elements with respect to the upright structure.

According to a third aspect of the present invention there is provided a method for building and deploying an elongate element in a J-lay operation, comprising:
providing a system comprising:
an upright structure;
a first and second clamping element, each clamping element traversable along the upright structure;
an actuating element configured to control movement of the first clamping element with respect to the upright structure;
the method further comprising coupling the second clamping element with the first clamping element; and
actuating the actuating element to control movement of both the first and second clamping elements with respect to the upright structure.

According to a fourth aspect of the present invention, there is provided a reel-lay system for the use in the building and deployment of an elongate element, comprising:
an upright structure;
a clamping element traversable along the upright structure; and
a workstation for providing access to an elongate element within the upright structure;
wherein the workstation is coupled to the clamping element such that the workstation is traversable along the upright structure via the clamping element.

According to a fifth aspect of the present invention, there is provided a method for use in the building and deployment of an elongate element in a J-lay operation, comprising providing a system comprising according to the fourth aspect.

Certain embodiments of the invention provide the advantage that an abandonment and recovery system can be moved into or out of the firing line of the pipeline.

Certain embodiments of the invention provide the advantage that the abandonment and recovery system can be automatically latched onto the pipeline.

Certain embodiments of the invention provide the advantage that compliance may be built into the system to help prevent over tensioning of the winch rope.

Certain embodiments of the invention provide the advantage that the time required to connect a pipe to the system may be reduced.

Certain embodiments of the invention provide the advantage of improved safety for workers operating the system.

Certain embodiments of the invention provide the advantage that a hang-off clamp can be retracted into an area more suitable for maintenance to take place.

Certain embodiments of the invention provide the advantage that the position of the hang-off clamp may be adjusted to accommodate different angles of the J-lay tower with respect to the vessel deck.

Certain embodiments of the invention provide the advantage that welding/coating operations and/or the addition of items to a pipe section may be performed at any point along the pipe.

Certain embodiments of the invention provide the advantage that the workstation may provide access to the firing line of the pipe section.

Certain embodiments of the invention provide the advantage that a workstation is provided that allows access to the pipeline in a reel-lay system.

Embodiments of the invention are further described hereinafter with reference to the accompanying drawings, in which:

FIGS. 2a-2d illustrate the step by step operation of a system for use in deployment of an elongate element in lay operation;

FIGS. 3a-3b illustrate the system of FIGS. 2a-2d with a catcher element being traversed in a retracted position;

FIGS. 5a-5c illustrate the step by step operation of a system for a lay operation;

In the drawings like reference numerals refer to like parts.

Figure 1:
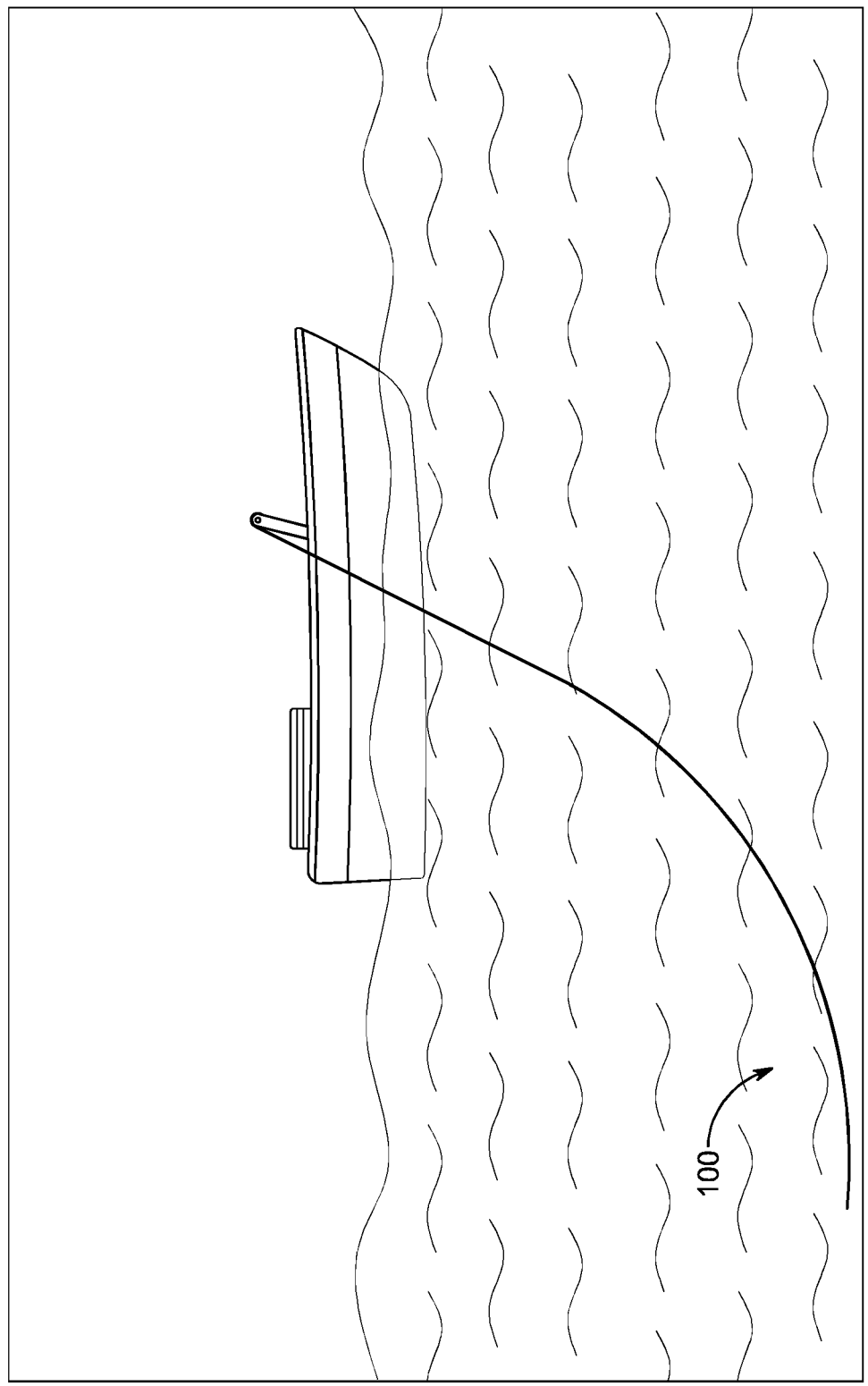
FIG. 1 illustrates a vessel with a lay assembly.

As used herein, the term "upright structure" is used to encompass any construction or assembly that extends upwards from a ground, floor or deck or the like and may extend upwards at any angle, and may change angle. For example, a J-lay tower extends upwards typically between 45 degrees and 90 degrees from a deck of a vessel. However, the structure may be approximately upright or extending outwards/upwards any amount or angle from a base, ground or deck.

EMBODIMENT 1

FIGS. 2a-2d and FIGS. 3a-3b illustrate a first embodiment of a system 200 for use in the building and deployment of an elongate element in a J-lay operation. The system may be used, for example, for ceasing and restarting the building and deployment of an elongate element in a J-lay operation.

FIGS. 2a-2d show an example of the first embodiment of system 200. The system 200 includes an upright structure 206, a coupling element 210 connected to the winching element 204 and a catcher element 212.

Figure 2B:
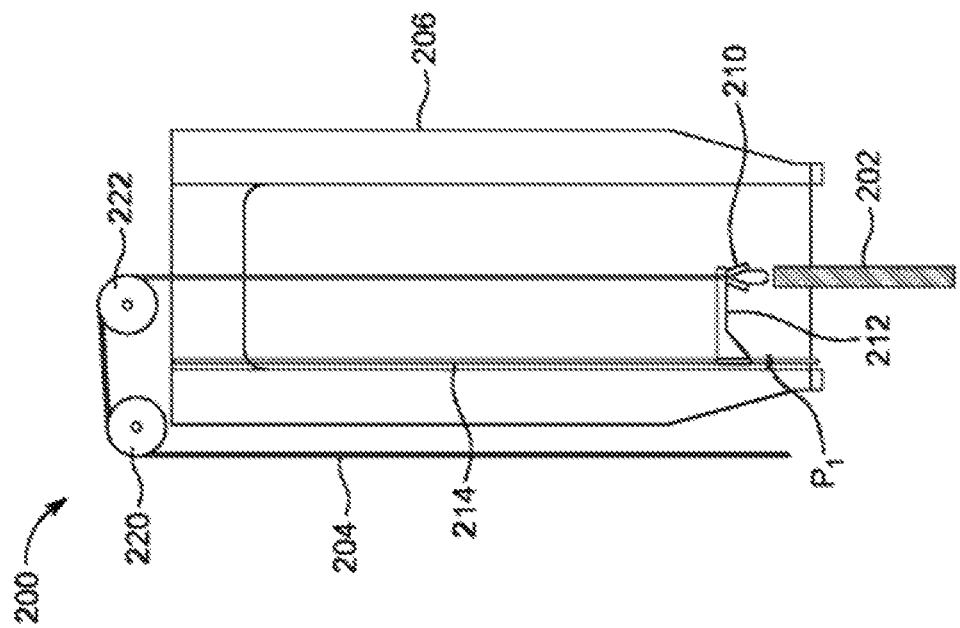
Figure 2A:
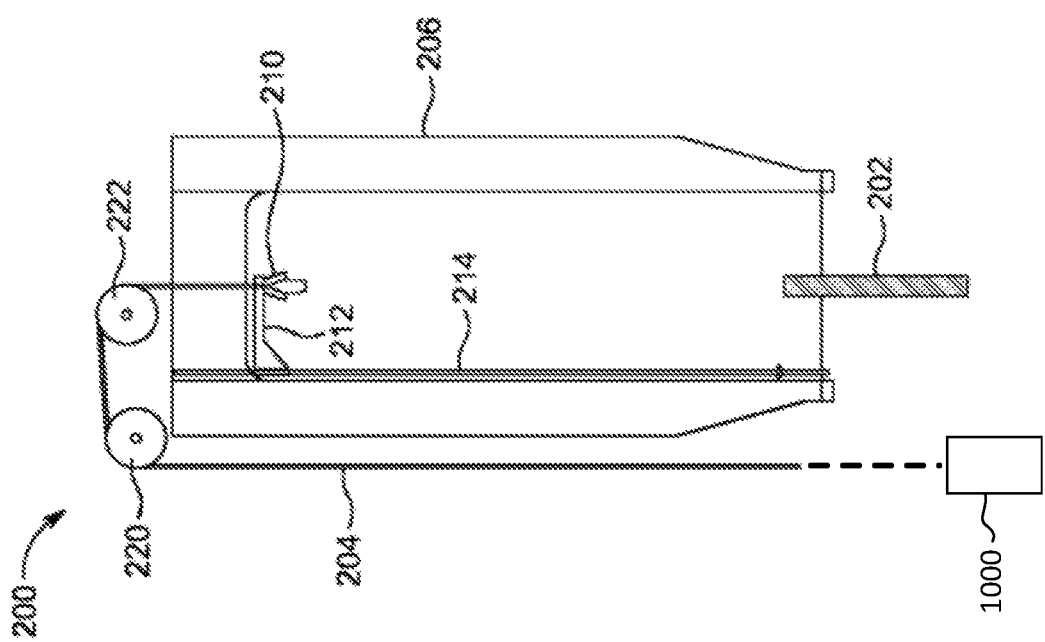

FIG. 2a illustrates the starting position of the system 200 when abandoning the building and deployment of an elongate element 202 in a J-lay operation. Abandoning the building and deployment may be carried out when a pipe construction is complete. Alternatively, adverse weather conditions may stop production, in which case the abandonment and recovery system is used to lower the pipe product towards the sea bed. When resuming production, the system is used to recover the pipe back to the vessel and lay system. In this example the upright structure is a J-lay tower 206.

In the initial position shown in FIG. 2a an elongate element 202 (e.g. a pipe section for use in a J-lay operation) is in an active position, i.e. the pipe section is not abandoned and is held in place by a clamping element (not shown). The clamping element may be either a moveable or a stationary clamp, for example.

In the initial position shown in FIG. 2a the coupling element 210 is connected to an end of the winching element 204 and is held in the firing line of the elongate element 202 by the winching element 204.

The firing line may generally be defined as the region of the tower that may be occupied by an elongate element as it is deployed.

The winching element 204 is retractable along an axis within the upright structure. In this example, the winching element is retractable in a direction substantially parallel to the elongate structure (i.e. vertically up and down in the example shown in FIG. 2a). In other words, the winching element 204 is retractable in a direction substantially along a longitudinal axis of the upright structure 206.

The coupling element 210 is configured for connecting to the elongate element 202. In this example the coupling element is a Spelter socket. In this example the winching element is a rope 204.

The catcher element 212 is configured to retain the coupling element 210 in alignment with a predetermined axis within the upright structure 206 during retraction or extension of the winching element 204. In this example, the predetermined axis extends along the longitudinal direction of the upright structure 206 and is within the firing line.

In this example, the catcher element 212 is located directly above the coupling element 210, such that a bottom surface of the catcher element engages with the coupling element. The catcher element 212 is slideably coupled to the upright structure 206 such that the catcher element 212 is traversable along the upright structure during retraction or extension of the winching element 204. In this way, the catcher element 212 can traverse up and down the upright structure 206 with the coupling element 210 and can retain the coupling element 210 in alignment with a predetermined axis (e.g. within the firing line) during retraction and extension of the winching element 204.

In this example, the upright structure 206 includes a rail 214 and the catcher element 212 is slidably mounted onto the rail 214. The rail 214 is mounted on the upright structure 206 so that it runs substantially parallel with the upright structure (i.e. parallel to a central longitudinal axis of the upright structure). In this way, the catcher element 212 may traverse along the rail 214 to move up and down the upright structure 206 (i.e. in a direction substantially parallel to the upright structure). Wheels or slider pads on the catcher element may engage the rail so that the catcher element is restrained in all but the direction parallel to the tower (i.e. up and down the tower).

The catcher element 212 may also be configured to guide the coupling element 210 from an operating position that is within the firing line (as shown in FIGS. 2a-2c) to a stowing position that is offset from the firing line of the upright structure 206 (as shown in FIGS. 2d, 3a-3b).

In this example, the catcher element 212 is configured to guide the coupling element 210 to traverse in a direction substantially perpendicular to the direction of the upright structure 206 (i.e. in a direction transverse the longitudinal axis of the upright structure) as the winching element 204 is retracted. In this way, the coupling element 210 can be moved away from the firing line of the pipe.

The rope 204 forms part of a hoist system (or winching system), including a hoist winch (1000) for retracting and extending (e.g. unwinding) the rope. The rope 204 is fed from the hoist winch, around first and second sheaves 220 and 222 respectively (and optionally additional sheaves), and to the coupling element 210.

The winch may be mounted at any suitable position on the vessel. For example, the winch may be deck mounted, or alternatively may be mounted on the upright structure.

The winch of the hoist system may be used to extend the rope 204 such that the coupling element 210 at the end of the rope 204 traverses down the J-lay tower. The winch of the hoist system may also retract the rope 204 such that the coupling element 210 traverses up the J-lay tower 206. In this example the coupling element 210 is traversed in a direction substantially parallel to the J-lay tower 206 (i.e. parallel to a central longitudinal axis of the J-lay tower). In this example the coupling element 210 is traversed along an axis which is within the firing line of the elongate element 202.

FIG. 2b illustrates the coupling element 210 during traversal down the J-lay tower 206. In this example, the catcher element 212 is also traversed down the J-lay tower, by sliding down the rail 214. The catcher element 212 engages with the coupling element 210 so that the catcher element 212 does not slide down the rail 214 to a position that is lower down the upright structure 106 than the coupling element 210. In other words, the catcher element 212 is at least partially supported by coupling element 210.

The catcher element 212, in this example, is weighted. As such, the weight of the catcher element 212 applies a force to the coupling element 212 to thereby help to tension the rope 204. Aptly, the weight of the catcher element 212 may be between 1000 kg and 10000 kg. In other examples tension may be applied to the rope by pulling the catcher element down the rail using a winch, or a rack and pinion. Applying tension to the rope 104 via the catcher element can help to control the position of the coupling element 210 as the rope 204 is extended, and may help to prevent the rope 204 from swinging (e.g. in a side to side motion).

The coupling element 210 is traversed down the J-lay tower 206 (controlled by the winch) until the catcher element 212 and the coupling element 210 reach a position in which to connect the pipe, which is aptly above a predetermined position $P_1$.

FIG. 2c illustrates the elongate element being abandoned by the system. Here the elongate element is supported only by the rope. The catcher element 212 is at the predetermined position $P_1$, with the coupling element 210 extended beyond the position $P_1$ further down the J-lay tower 206. In this example, the predetermined position $P_1$ is the lowest point at which the catcher element 212 can traverse down the J-lay tower. In this example, at the position $P_1$, there is an obstruction on the rail 214, which prevents the catcher element 212 from passing. However, the position $P_1$ may alternatively be the end of the rail 214, which includes a stopping element to prevent the catcher element 212 sliding off the rail 214. In this example, the position $P_1$ corresponds to the position at which the coupling element contacts the field joint of the elongate element.

Referring back to FIG. 2b, once the catcher element 212 reaches the position $P_1$, the coupling element 210 contacts and is coupled to the field joint of the elongate element. After the coupling element 210 is coupled to the elongate element 202, the elongate element is released from the clamping element (not shown).

The hoist winch continues to extend the rope 204 to traverse the coupling element 210 down the J-lay tower and in doing so lowers the coupled elongate element 202.

Once the coupling element 210 and the elongate element 202 have reached the desired location (e.g. on the sea bed), the coupling element 210 is then decoupled from the end of the elongate element, for example, using a remotely operated vehicle, ROV.

The hoist winch then retracts the rope 204 such that the coupling element 210 traverses up the J-lay tower 206 (in the direction substantially parallel to the J-lay tower). The coupling element 210 is traversed up the J-lay tower until the coupling element 210 contacts an underside of the catcher element 212 (which may include a retaining element for retaining the coupling element in position).

The hoist winch continues to retract the rope 204, such that the coupling element 210 and the catcher element 212 traverse up the J-lay tower 206. The coupling element 210 and the catcher element 212 continue to traverse up the J-lay tower 206 until the catcher element 212 reaches a predetermined position $P_2$.

In this example, the predetermined position $P_2$ is the furthest point at which the catcher element 212 can traverse up the J-lay tower. In this example the position $P_2$ is an obstruction on the rail 214, which prevents the catcher element from passing. However the position $P_2$ may be the end of the rail 214, which may include a stopper to prevent the catcher element 212 from sliding off the rail 214.

Figures 4A, 4B:
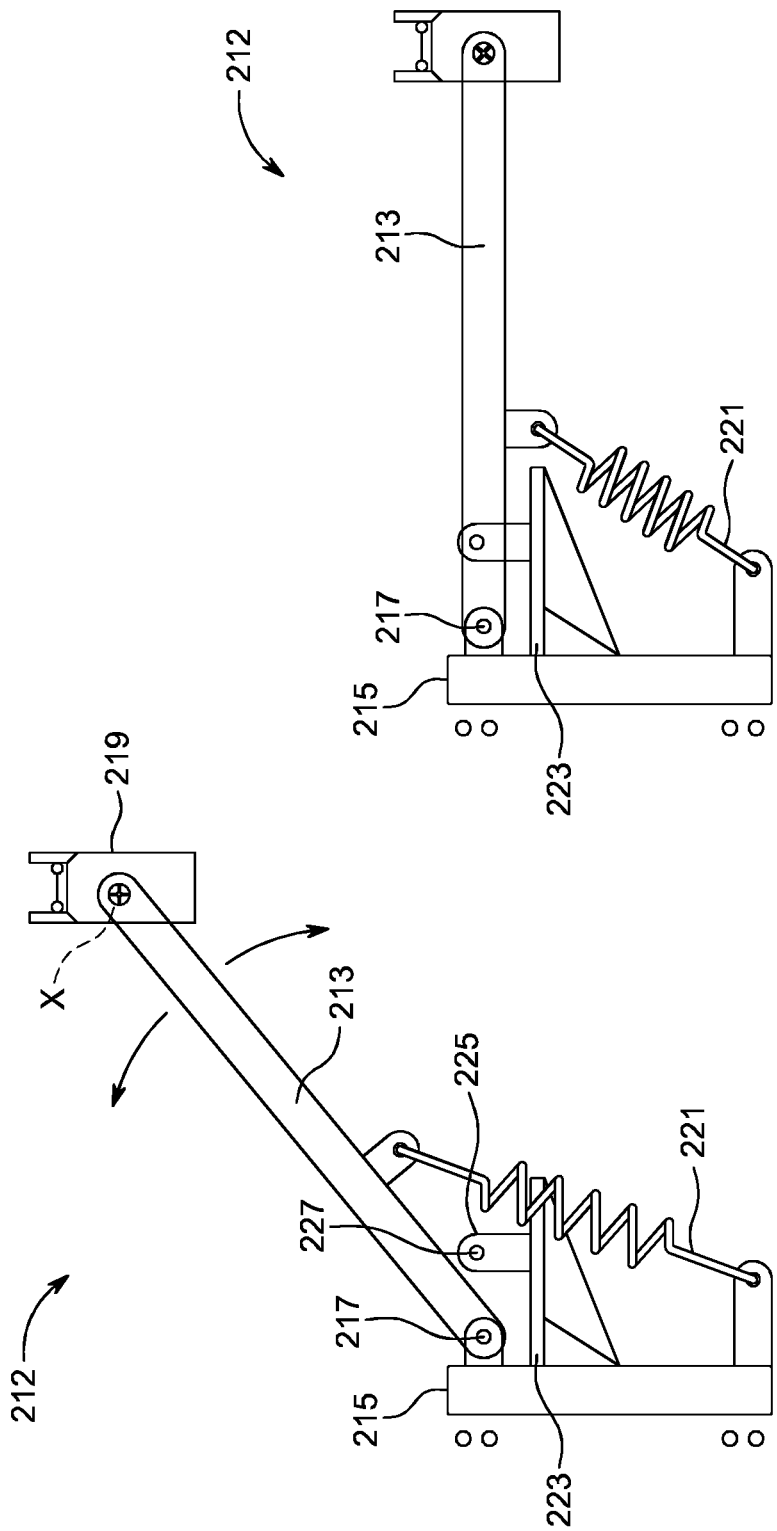
FIGS. 4a-4b illustrate a catcher element in a stowing and an operating position respectively.

FIGS. 4a-4b illustrate an example of a catcher element 212. The catcher element 212 includes an arm 213 that is pivotally connected to a trolley 215. The trolley 215 is configured to engage and slide along the rail 214 of the upright structure 206.

The arm 213 pivots about pivot point 217 and a retaining element 219 for engaging the coupling element 210 is provided on the arm distal from the pivot point 217. The arm 214 is configured to pivot between a stowing position (as shown in FIG. 4a) and an operating position (as shown in FIG. 4b). In the stowing position the retaining element 219 is offset from the firing line of the upright structure. In the operating position, the retaining element 219 is within the firing line of the upright structure.

A biasing element 221 biases the arm towards the operating position shown in FIG. 4b. A support 223 extends, preferably substantially perpendicularly, to the trolley 215 and prevents the arm 213 from pivoting beyond the operating position.

Figure 4C:
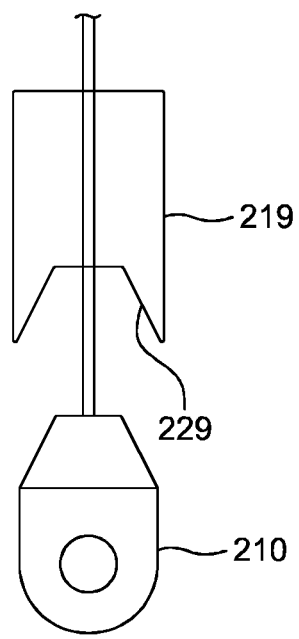
FIG. 4c illustrates a retaining element of the catcher element.

FIG. 4c illustrates an example of a retaining element 219. The retaining element 219 may include a socket 229 for receiving the coupling element 210 having a corresponding portion for engaging the socket 229. Aptly, the socket 229 is shaped to substantially cup the coupling element 210 to prevent transverse movement of the coupling element 210 with respect to the longitudinal direction of the tower.

Referring back to FIG. 2d, once the catcher element 212 reaches position $P_2$, the hoist winch continues to apply a force to rope 204 so as to retract the rope. As the coupling element 210 is retained by the catcher element 212 (e.g. in the retaining element 219), the rope 204 is prevented from retracting and hence the tension in rope 204 increases.

The increase in tension in rope 204 causes the arm 213 of the catcher element 212 to rise, and thus move towards the stowing position. The catcher element may comprise a locking element for locking the catcher element in the stowing position. In the example shown in FIG. 4a-4b, the locking element 225 is provided on the support 223. A pin may be located through an aperture 227 in the support to prevent pivotal movement of the arm 213 back towards the operating position.

In the stowing position, the arm 213 may pivot further away from the operating position if further tension is applied to the rope. This allows for any variation in tension in the rope (e.g. due to a change in angle of the tower with respect to the vessel deck).

FIG. 2d illustrates the system when the catcher element 212 has been retracted to the predetermined position $P_2$ and the catcher element 212 and coupling element 210 have been placed in the stowing position out of the firing line of the elongate element.

The natural position of the coupling element 210 with minimum back tension on the rope 204, when the catcher element 212 is at position $P_2$, is in the firing line of the elongate element (e.g. due to the force exerted on the arm 213 by the biasing element 221). As such, the coupling element 210 can be returned to the firing line by releasing the tension in the rope 204 so that the arm 213 can pivot back to the operating position.

Although this example describes the system being used for abandoning an elongate element, it may also be used for recovering and restarting the building and deployment of the elongate element. The steps for recovery will generally be a reverse procedure to the abandonment steps described above.

FIGS. 3a and 3b illustrate another example of the first embodiment of the system 200. Specifically, FIGS. 3a and 3b illustrate how the coupling element 210 can be traversed down the J-lay tower 206 along an axis that is not within the firing line of the elongate element 202. For this operation, the catcher element 212 is locked into the stowing position (e.g. as described above in relation to FIG. 4a).

FIG. 3a illustrates the system 200 when the catcher element 212 has been retracted to the predetermined point $P_2$ and the coupling element 210 has been traversed along the catcher element 212, so that it is out of the firing line of the elongate element.

The coupling element 210 and catcher 212 can then be traversed down the J-lay tower, with the coupling element 210 out of the firing line of the elongate element 202, as shown in FIG. 3b.

Various modifications to the detailed designs as described above are possible.

It should be noted that although the J-lay tower 206 in FIGS. 2a-2d and 3a-3b is vertical (i.e. at 90 degrees to the deck of the vessel, which is not shown in FIGS. 2a-2d and 3a-3b), it may be situated at any angle according to the required angle of deployment of the elongate element. The angle of the tower may also be changed during use to accommodate for the changing depth of water along the lay-line. That is, for shallower water, the tower is moved forward, away from the 90 degree position. This allows the lay-line of the pipe to keep the pipe within its elastic bending limits, to avoid damage to the pipeline.

Rather than a rope or ropes, the winching element 204 for traversing the connector element adjacent the J-lay tower may utilize chains or cords, or the like.

It will be appreciated that although the system has been described in relation to movement of a pipe section for a J-lay operation, the system may be more widely used for positioning other elongate elements.

Although the coupling element is described above as a Spelter socket, other suitable coupling elements may be used. For example, the coupling element may be any suitable shackle or masterlink.

Although in the examples above only a single abandonment and recovery system is used, there may be two or more abandonment and recovery systems used concurrently to give a higher capacity. This requires each abandonment and recovery system to be a set distance from the firing line of the elongate element so that they can run in parallel with each other.

With the above described examples, the coupling element may be guided by the catcher element as the coupling element is retracted or extended by the winching element. This helps to control the movement of the coupling element and may prevent excessive sideways movement, which can sometimes be amplified by wave movements or longitudinal movements of the vessel.

The catcher element advantageously supports the coupling element to prevent swinging of the coupling element when the tower is provided at an angle other than perpendicular to the vessel deck.

The coupling element of the above described examples may be guided to the correct position within the firing line for coupling with a pipe. In addition, the coupling element may be retracted and moved from the firing line when it is not needed.

The catcher element provides an advantageous arrangement for guiding the coupling element as it is retracted and extended within the tower, as an extra winch is not required for restricting the movement of the coupling element.

EMBODIMENT 2

FIGS. 5a-5c illustrate an example of a second embodiment of a system 400 for use in the building and deployment of an elongate element in a J-lay operation. The system may be used, for example, during a J-lay procedure.

The system 400 includes an upright structure 206, a first moveable clamping element 440 and a second moveable clamping element 442. Each of the first and second clamping elements 440, 442 are traversable in a direction substantially parallel to the upright structure. In this example the upright structure is a J-lay tower 206.

FIG. 5a illustrates a J-lay tower 206 mounted on a vessel 300. In this example the J-lay tower is mounted vertically (i.e. at 90 degrees to the deck of the vessel).

The system includes a clamp rail 430 mounted within the J-lay tower. In this example the clamp rail 430 is mounted substantially parallel to the J-lay tower (i.e. substantially parallel to a longitudinal axis of the J-lay tower).

The first clamping element 440 is traversable along the J-lay tower. In this example, the first clamping element 440 is slidably coupled to clamp rail 430 such that it traverses along the J-lay tower via the clamp rail 430.

During a J-lay operation (not depicted in FIGS. 5a-5c), the first clamping element 440 may be used to support an elongate element. The first clamping element 440 may actuate to clamp a segment of the elongate element. The first clamping element may support the elongate element while a lower end of the elongate element is coupled to a field joint of a previously deployed pipe line. The first clamping element may be traversed down the J-lay tower (via the clamp rail 430) to lower the elongate element along a firing line into a deployed position.

In this example, an actuating element 480 is connected to the first clamping element 440 to control movement of the first clamping element 440 along the clamp rail 430. The actuating element 480 includes a sheave block. Actuation is achieved by a winch via a rope around the sheaves.

In this example the second moveable clamping element is a hang off clamp 442 located in a lower end of the J-lay tower 206. The hang off clamp 442 is attached to the J-lay tower 206 by via the rails 430.

During a J-lay operation (not depicted in FIGS. 5a-5c), the hang-off clamp 442 supports a previously deployed pipe section. The first moveable clamping element 440 on the tower may lower a second pipe section so that it may be connected with the field joint of the previously deployed pipe section that is supported by the hang-off clamp 442. Once the pipe sections are joined, the hang-off clamp 442 may release the lower pipe section so that the entire pipe is supported by the first clamping element 440. The first clamping element 440 may move downwards towards the hang-off clamp 442 located in the lower end of the J-lay tower to lower the pipe section into the sea (to deploy the pipe section) following the firing-line/lay-line. Thus the upper end of the upper pipe section becomes the next field joint. The hang-off clamp 442 may then clamp onto the field joint, such that the entire pipe is supported by the hang-off clamp 442. The first clamping element 440 may then release the pipe and return up the J-lay tower to the initial position.

Typically, the first moveable clamping element and the hang off clamp have a capacity of 600 to 2000 tonnes, which is sufficient to support the weight of the deployed pipe following attachment of the pipe section to the deployed pipe.

Both the first and second clamping elements are controlled from a pipe-lay control room that may be situated in a container on the deck of the vessel (not shown). The first and second clamping elements are controlled from the pipe-lay control room using a coordinated control system (Scada for example). The coordinated control system, typically includes hydraulic actuators and electronic sensor feedback. The first and second clamping elements may also be controlled separately, including locally or semi-locally, for example when maintenance is required.

The first clamping element 440 may be coupled to the second clamping element 442 so that the actuating element 480 can control movement of both of the first and second clamping elements 440, 442 simultaneously.

In this example the first clamping element 440 has an initial position substantially mid-way down the J-lay tower, as shown in FIG. 5a. Alternatively the first clamping element may be in an initial position anywhere along the J-lay tower, for example the first clamping element may be in an initial position at the top of the J-lay tower.

The actuating element 480 controls the movement of the first clamping element 440 to allow the first clamping element 440 to traverse down the J-lay tower. In this example, the first clamping element 440 traverses down the J-lay tower until it can interface with the second clamping element, as shown in FIG. 5b.

In this example the first moveable clamping element is directly coupled to the second moveable clamping element by rigging or lock pins, for example.

The actuating element 480 may then control movement of the first clamping element 440 so that the first clamping element 440 traverses up the J-lay tower. As the first clamping element 440 is coupled to the second clamping element 442, the second clamping element also traverses up the J-lay tower.

In this example the system further includes a workstation 460. In this example, the workstation 460 is mounted on the deck of the vessel.

The workstation is situated away from the splash zone of the J-lay tower. In this example the workstation is situated on the deck of the vessel 460, above the splash zone.

In this example, the first clamping element 440 and second clamping element 442 are traversed along the J-lay tower until the second clamping element 442 is at a height within the tower corresponding to the height of the workstation 460, as shown in FIG. 5c. In this manner, workers situated within the workstation will have access to the second clamping element 442 from the workstation 460. For example workers may be able to carry out maintenance or adjustment work to the second clamping element 442. For example, workers may change the pads on the second clamping element to thereby accommodate different diameter pipe sections.

Once work on the second clamping element is completed, actuating element may lower the first clamping element 440 and the coupled second clamping element 442 so that they are traversed down the J-lay tower until the second clamping element 442 is returned back to its initial position at the lower end of the J-lay tower. The clamping elements can then be uncoupled and the first moveable clamping element can be returned by the actuating element to its initial position.

Various modifications to the detailed designs as described above are possible.

The first moveable clamping element and the second moveable clamping element may be indirectly coupled together. For example, the first moveable clamping element and the second moveable clamping element may be coupled together via an elongate element (for example a pipe section), onto which both clamping elements are clamped.

The workstation may be located at any point along the J-lay tower.

Rather than the actuating element 480 described above, movement of the first clamping element 440 may be controlled by a rope, which is attached to a hoist winch (not shown). The rope may be coupled to the first clamping element 440 so that as the rope is retracted, the first clamping element traverses up the J-lay tower, and thereby the second clamping element traverses up the J-lay tower, and as the rope is extended, the first clamping element traverses down the J-lay tower, and thereby the second clamping element traverses down the J-lay tower. Any suitable winch may be used, for example a double-drum hoist winch. The winch may be mounted at any suitable position on the vessel, e.g. the winch may be deck mounted. This actuating arrangement may be used in combination with the rail 430 to help guide the clamping element, or in some examples the rail may not be present.

Maintenance work that may be carried out on the hang-off clamp may include pad changing, greasing, or other general maintenance.

With the above-described examples, maintenance and adjustments of the hang-off clamp may be possible from the workstation. Thus, the arrangement provides much improved access the hang-off clamp for workers and may allow for more complex maintenance or adjustment procedures to be carried out.

EMBODIMENT 3

FIGS. 6a-6c and FIGS. 7a-7b illustrate an example of a third embodiment of a system 600 for use in the building and deployment of an elongate element in a reel-lay operation. The system may be used, for example, for traversing a workstation along a reel-lay tower.

The system includes an upright structure 606, a clamping element 602 and a workstation 604 coupled to the clamping element 602. In this example the upright structure is a reel-lay tower.

Figure 6A:
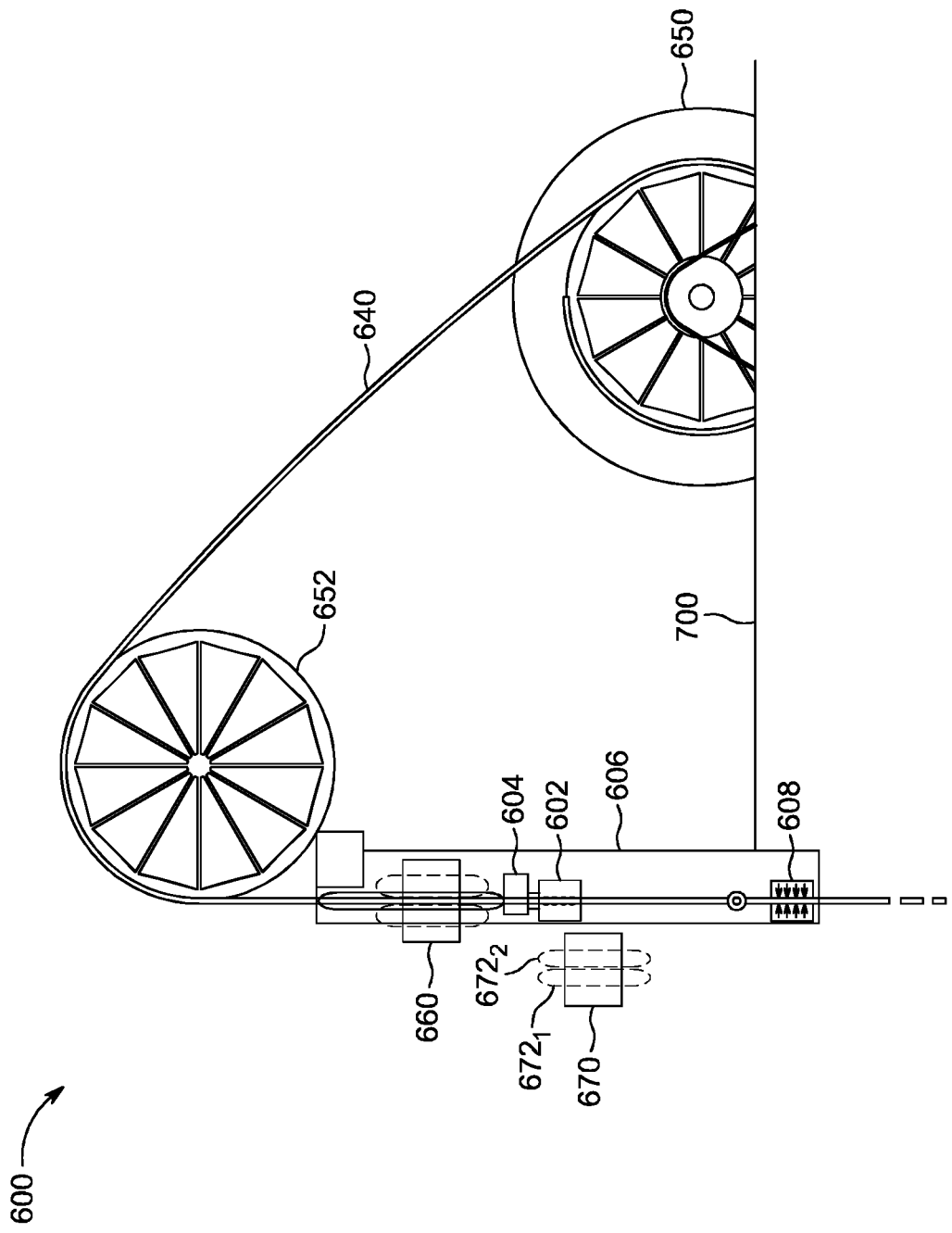
FIGS. 6a-6c illustrate a travelling clamp comprising a mounted workstation.

FIG. 6a illustrates a reel-lay tower 606 mounted on a vessel 700. In this example the reel-lay tower is mounted vertically (i.e. at 90 degrees with respect to the deck of the vessel). In other embodiments, the reel-lay tower may be mounted at any different angle with respect to the deck of the vessel.

The system includes a clamp rail (not shown) mounted within the reel-lay tower. In this example the clamp rail is mounted substantially parallel to the reel-lay tower.

The clamping element 602 is traversable along the reel-lay tower. In this example, the clamping element 602 is slidably coupled to the clamp rail such that it traverses along the reel-lay tower via the clamp rail. The clamping element 602 may be traversable by any suitable means. In this example the clamping element may be powered by a winch (not shown) attached to the clamping element (not shown). The winch may power wheels or slider pads, attached to the clamping element which are engaged with the clamp rail.

Figure 6B:
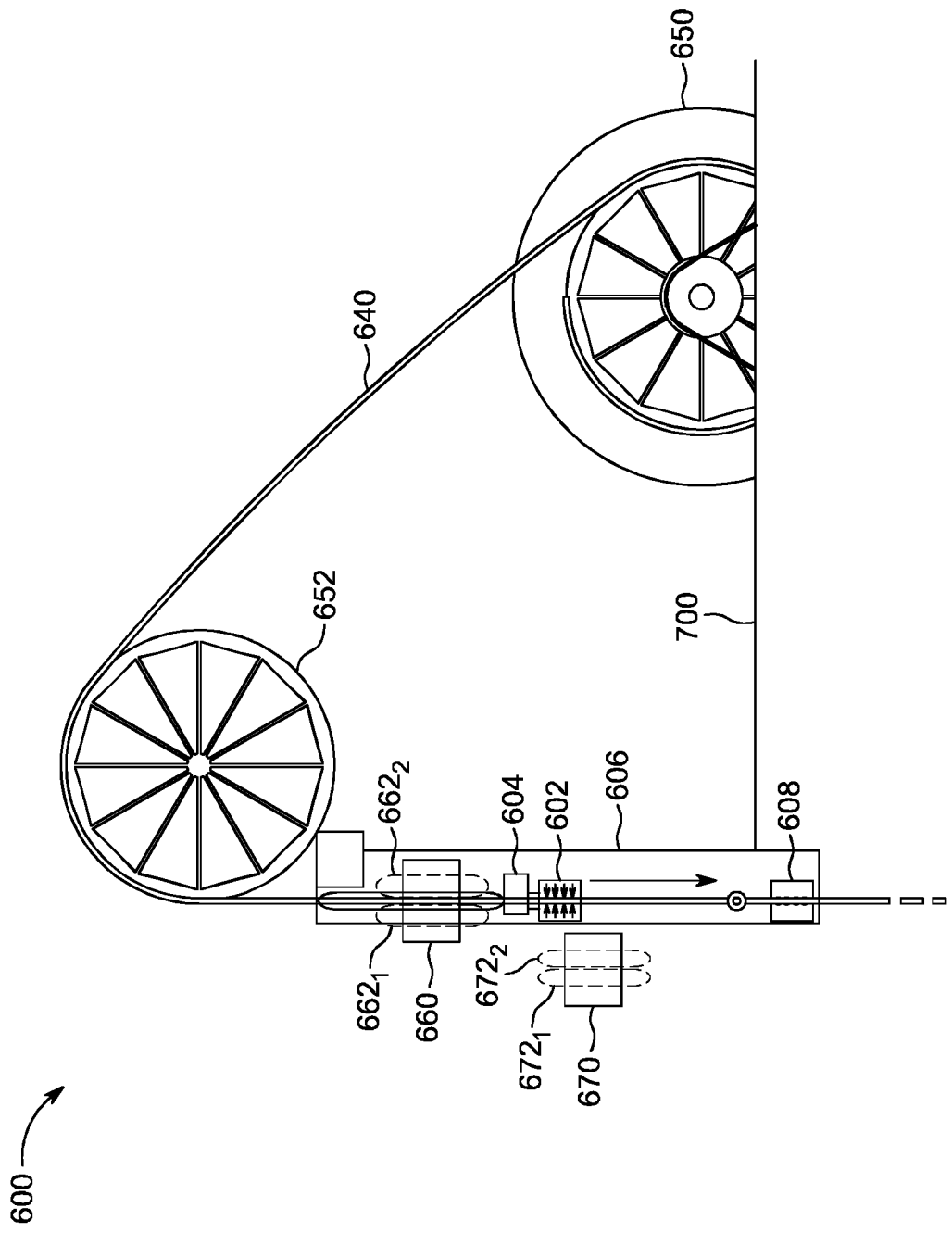
Figure 6C:
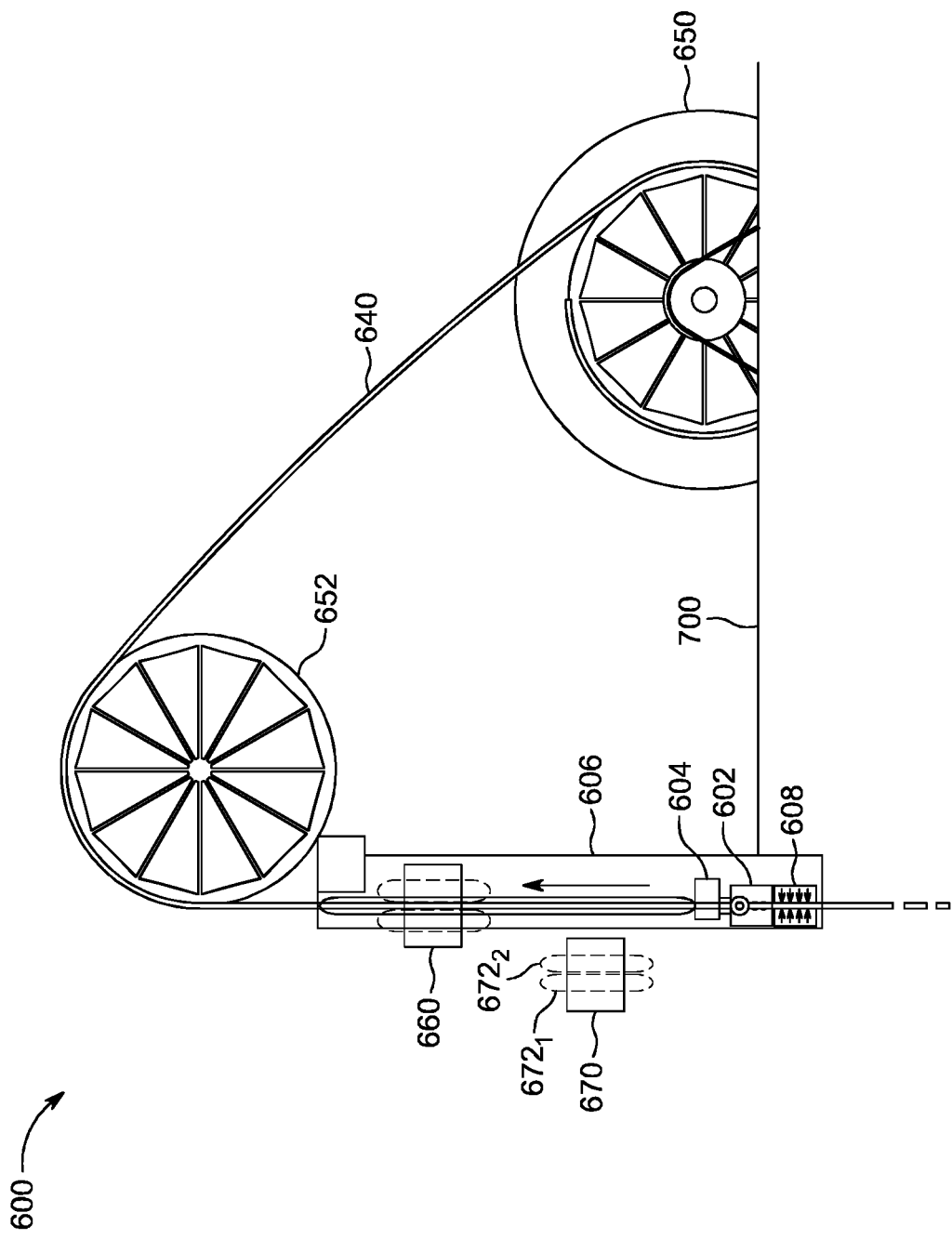
Figure 7B:
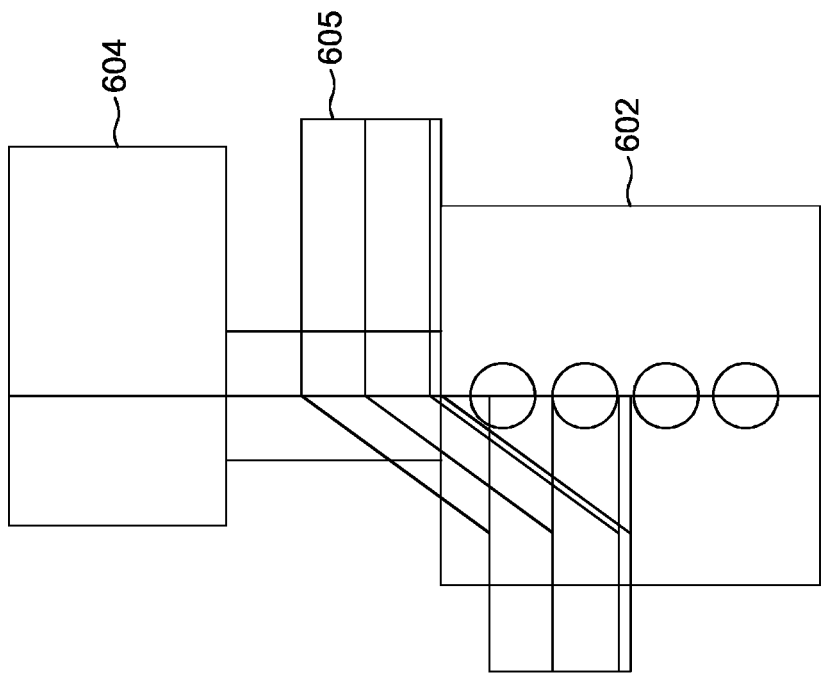
FIGS. 7a-7b illustrate aerial and side views respectively of the travelling clamp comprising the mounted workstation of FIGS. 6a-6c.
Figure 7A:
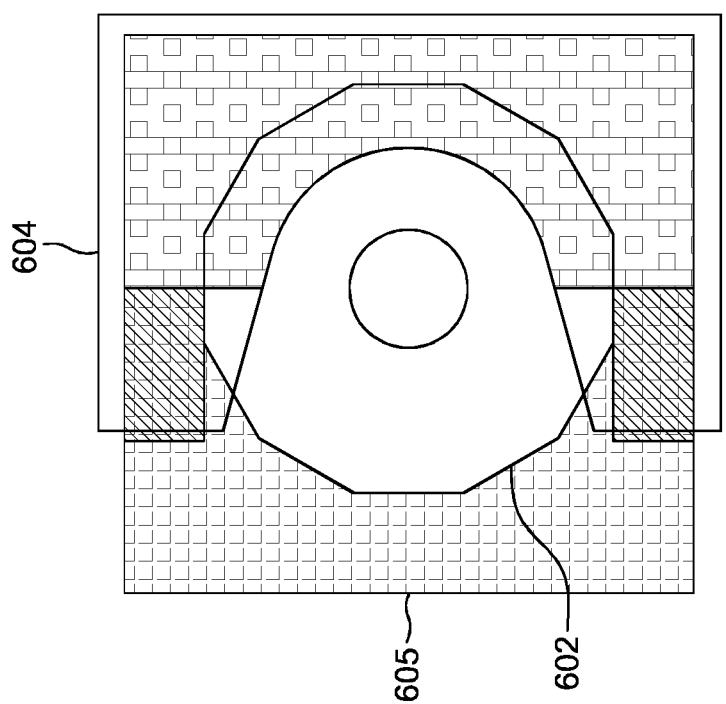

FIGS. 7a and 7b illustrate aerial and side views respectively of the clamping element comprising a mounted workstation of FIGS. 6a-6c. The workstation provides access to the elongate element within the reel-lay tower. The workstation is coupled to the clamping element such that the workstation is traversable along the upright structure via the clamping element.

The clamping element may be provided with a workstation of any configuration and/or any number of workstations. In this example the clamping element includes a workstation 604 and a further workstation 605. The workstation 604 and further workstation 605 may be connected for example by a stairway, a ladder or rigging. The workstation 604 may be of any suitable configuration, which provides access to the elongate element (not shown in FIGS. 7a and 7b).

Referring back to FIG. 6a, in this example, the system further includes spool 650 and sheave 652. In the initial configuration, as shown in FIG. 5a, the elongate element 640 extends from the spool 650 over the sheave 652 and into the reel-lay tower 606.

In this example the system further includes an upper tensioner 660 mounted within the reel-lay tower. The elongate element 640 extends through the upper tensioner 660. The upper tensioner is configured to traverse the elongate element 640 through the reel-lay tower along a predetermined axis. In this example the predetermined axis is substantially parallel to the reel-lay tower. The upper tensioner 660 may do this in any number of ways.

In this example the upper tensioner traverses the elongate element 640 through the reel-lay tower using a pair driven tracks $662_{1-2}$, which are driven in opposite directions to each other to traverse the elongate element 640 either up or down the reel-lay tower.

In this example the system further includes a lower tensioner 670. The lower tensioner is moveable from a use position for engaging a pipe in the system to a non-use position away from the firing line of the pipe.

The lower tensioner is configured to traverse the elongate element 640 along the predetermined axis within the reel-lay tower when the tensioner is in the use position. The lower tensioner 670 may do this in any number of ways. In this example the upper tensioner traverses the elongate element 640 through the reel-lay tower using a pair driven tracks 672₁₋₂, which are driven in opposite directions to each other to traverse the elongate element 640 either up or down the reel-lay tower.

In this example the system further includes a hang-off clamp 608. In FIG. 6a the hang-off clamp is mounted in the reel-lay tower.

In use, the elongate element is traversed in a direction substantially parallel to the reel-lay tower by the upper and lower tensioners 660, 670 respectively. The hang-off clamp is actuated such that the hang-off clamp is clamped onto the elongate element. That is, the elongate element is supported by the hang-off clamp, as shown in FIG. 6a.

The lower tensioner 670 may then be moved from the use position to the non-use position, as shown in FIG. 6a. In this example the non-use position is situated outside the reel-lay tower, although this position may lie partially within the reel-lay tower. Alternatively this position may lie fully within the reel-lay tower.

The clamping element 602 may then be actuated, such that the elongate element is supported by the clamping element 602, as shown in FIG. 6b.

The clamping element 602 is traversable through a stroke length along the reel-lay tower. That is, the clamping element 602 is traversable from a first position of the stroke length to a second position of the stroke length. In this example the stroke length is from upper tensioner 660 to the hang off clamp 608.

The clamping element 602 may then traverse the elongate element along the reel-lay tower through a stroke length of the clamping element 602.

The clamping element is configured to traverse the elongate element along a predetermined axis within the upright structure when the clamping element is actuated. In this example the clamping element 602 traverses the elongate element along the predetermined axis down the reel-lay tower through a stroke length, as shown by the arrow in FIG. 6b.

The hang-off clamp may then actuate and engage the elongate element, such that the elongate element is supported by the hang-off clamp. The clamping element 602 may then traverse back up the reel-lay tower. The process may then repeat.

As the workstation is on the clamping element, coating operations and/or the addition of pipe jewelry can be undertaken at any point that the clamping element is static with respect to the elongate element. For example coating operations and/or the addition of pipe jewelry may be undertaken while the clamping element is at the top of its stroke length. Alternatively coating operations and/or the addition of pipe jewelry may be undertaken while the travelling clamp is at the bottom of its stroke length. Alternatively coating operations and/or the addition of pipe jewelry may be undertaken while the travelling clamp is traversing the elongate element.

Although FIGS. 6a-6c show the travelling clamp comprising a mounted workstation being utilised in a specific arrangement for a reel-lay operation, the travelling clamp comprising a mounted workstation may be used on any reel-lay arrangement including a moveable clamping element.

The clamping element 602 may traverse any allowable distance along the reel-lay tower. For example the clamping element 602 may traverse through half a stroke length or a quarter of a stroke length. As such the clamping element 602 may traverse the elongate element 640 any allowable distance along the reel-lay tower.

The reel-lay system may be situated on a vessel. The reel-lay system may include an additional workstation. The additional workstation may be located on the deck of the vessel.

Removing the lower tensioner from within the reel-lay tower may allow the clamping element to traverse a full stroke length. That is removing the lower tensioner from the reel-lay tower may allow coating operations and/or the addition of pipe jewelry to be undertaken along a greater length of the pipe section.

With the above-described examples, access to the pipe may be possible from multiple workstations simultaneously at various locations along the pipe. This allows for more efficient operations as multiple tasks may be performed concurrently.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A system for use in building and deployment of an elongate element in a J-lay operation, comprising:
   an upright structure;
   a winching system comprising a winching element retractable along an axis within the upright structure and a winch for retracting the winching element;
   a coupling element connected to the winching element, for coupling the winching element to an elongate element; and
   a catcher element configured to retain the coupling element in alignment with a predetermined axis within the upright structure during retraction or extension of the winching element, wherein the catcher element is configured to guide the coupling element from an operating position within a firing line of the upright structure to a stowing position offset from the firing line of the upright structure, and wherein the catcher element comprises an arm having a pivot at a first end and a retaining element distal from the pivot for retaining the coupling element in alignment with the predetermined axis.

2. The system according to claim 1, wherein the catcher element is slideably coupled to the upright structure such that the catcher element is traversable along the upright structure during retraction or extension of the winching element.

3. The system according to claim 2, wherein the catcher element is slideably coupled to the upright structure via a rail extending along the upright structure.

4. The system according to claim 3, wherein the rail is substantially parallel with a central longitudinal axis of the upright structure.

5. The system according to claim 1, where the arm is pivotal between the operating position in which the retaining element is positioned within the firing line of the upright structure, and the stowing position in which the retaining element is in a position offset from the firing line of the upright structure.

6. The system according to claim 5, wherein the catcher element further comprises a biasing element configured to bias the pivotal arm to the operating position.

7. The system according to claim 5, wherein the catcher element further comprises a locking element for securing the arm in the stowing position.

* * * * *